(12) United States Patent
Wang et al.

(10) Patent No.: US 10,778,428 B1
(45) Date of Patent: Sep. 15, 2020

(54) METHOD FOR RESTORING PUBLIC KEY BASED ON SM2 SIGNATURE

(71) Applicant: Alibaba Group Holding Limited, George Town (KY)

(72) Inventors: Yao Wang, Hangzhou (CN); Hao Lei, Hangzhou (CN); Li Lin, Hangzhou (CN)

(73) Assignee: Allibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/714,201

(22) Filed: Dec. 13, 2019

Related U.S. Application Data

(63) Continuation of application No. PCT/CN2019/089602, filed on May 31, 2019.

(51) Int. Cl.
*H04L 9/30* (2006.01)
*H04L 9/08* (2006.01)
*H04L 9/32* (2006.01)

(52) U.S. Cl.
CPC .......... *H04L 9/0894* (2013.01); *H04L 9/3033* (2013.01); *H04L 9/3066* (2013.01); *H04L 9/3236* (2013.01); *H04L 9/3247* (2013.01)

(58) Field of Classification Search
CPC ... H04L 9/3066; H04L 9/3033; H04L 9/3236; H04L 9/3247
See application file for complete search history.

(56) References Cited

U.S. PATENT DOCUMENTS

2009/0214027 A1* 8/2009 Landrock ............... H04L 9/002
380/30
2016/0352525 A1* 12/2016 Antipa ................. H04L 9/0618
2019/0036692 A1 1/2019 Sundaresan et al.

FOREIGN PATENT DOCUMENTS

CN 106878022 6/2017
CN 109617699 4/2019

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/089602, dated Feb. 14, 2020, 6 pages.

* cited by examiner

*Primary Examiner* — Olugbenga O Idowu
(74) *Attorney, Agent, or Firm* — Fish & Richardson P.C.

(57) ABSTRACT

Disclosed herein are methods, systems, and apparatus, including computer programs encoded on computer storage media, for recovering and verifying a public key. One of the methods includes accepting information encoding parameters of an elliptic curve, a published public key, a hash value of a message, a digital signature, and an identification parameter; generating a recovered public key based on the parameters of the elliptic curve, the hash value of the message, the digital signature, and the identification parameter; comparing the published public key and the recovered public key to verify the published public key.

18 Claims, 9 Drawing Sheets

US 10,778,428 B1

METHOD FOR RESTORING PUBLIC KEY BASED ON SM2 SIGNATURE

CROSS-REFERENCE TO RELATED APPLICATIONS

This application is a continuation of PCT Application No. PCT/CN2019/089602, filed on May 31, 2019, which is hereby incorporated by reference in its entirety.

TECHNICAL FIELD

This specification relates to public key infrastructure in the context of blockchain technology.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer. The blockchain technology was originally designed as a special distributed database technology for bitcoin (a digital currency). It is suitable for storing simple, sequential data that can be verified in the system, using cryptography and consensus algorithms to ensure that the data cannot be falsified and unforgeable.

"Digital identity" refers to the condensing of real identity information into a digital code, which can include a public key to be queried and identified through a network or related devices. Once generated according to the private key of a user, the digital identity of the user can be verified by other people on the network. This paradigm is referred to as the public key infrastructure, which operates an asymmetric cryptosystem premised on a pair of a public key and a private key. In this paradigm, a private key is the key that the entity maintains itself and only the entity itself knows. The public key, on the other hand, can be publicized.

It would be desirable to achieve faster restoration and verification of a public key associated with a digital identity presented by a sender to a receiver to improve trusted transactions in a distributed computing environment such as a blockchain network.

SUMMARY

This specification describes technologies for recovering and verifying a public key in the context of a blockchain network. These technologies generally involve extracting information from a message transmitted over the blockchain network, recovering a public key from the information, and comparing the public key as recovered with an already published public key to determine the veracity of the public key. In particular, the information extracted from the message includes an identification parameter in addition to a hash value of the message, a digital signature embedded by the transmitter of the message, and parameters of an elliptic curve. By virtue of the identification parameter, some embodiments can expeditiously recover the public key based on the information as extracted. In these embodiments, the elliptic curve digital signature algorithm (ECDSA) is generally used to achieve comparable encryption results as the Rivest-Shamir-Adleman (RSA) algorithms, but with fewer bits.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
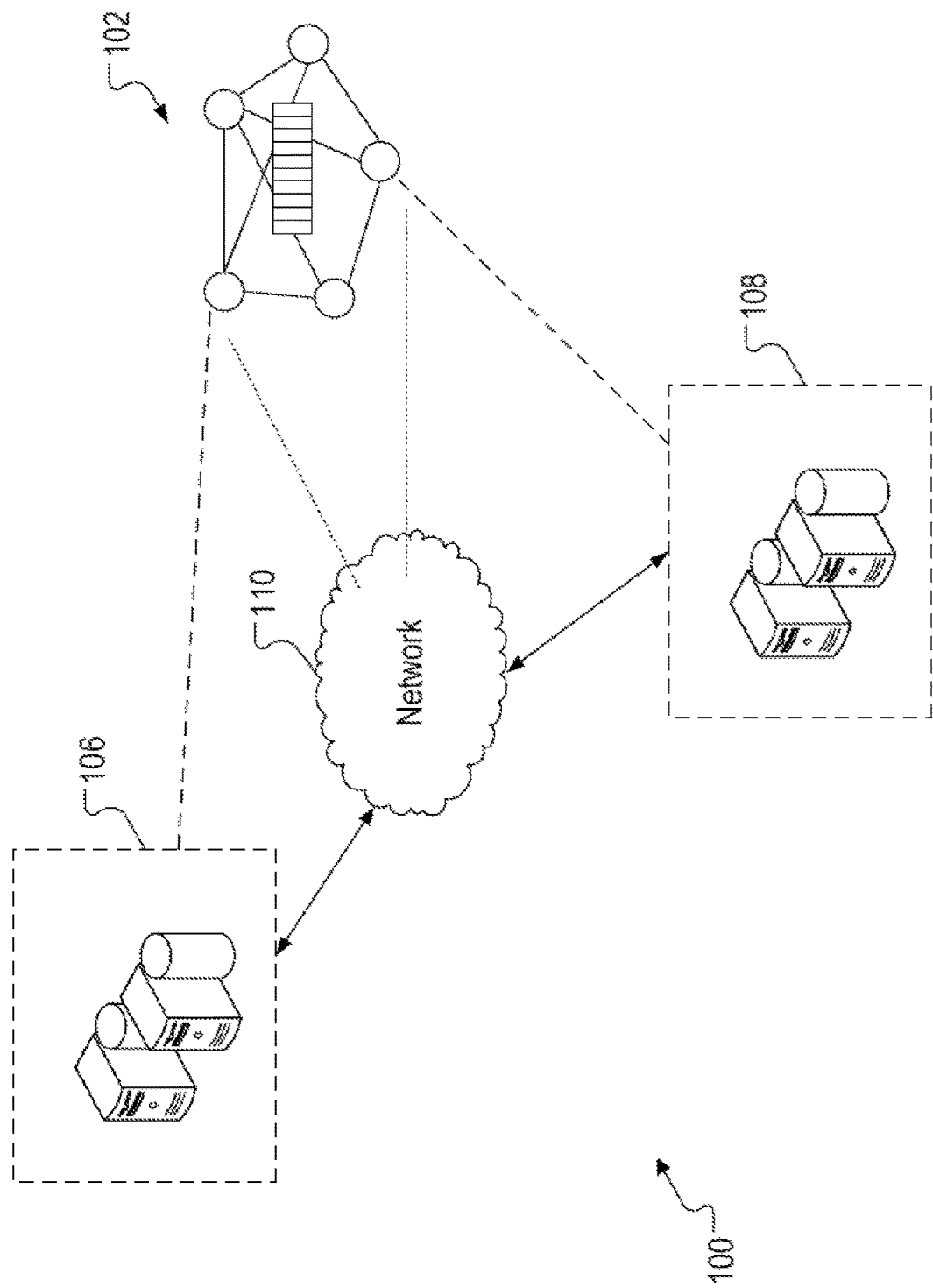
FIG. 1 is a diagram illustrating an example of an environment that can be used to execute embodiments of this specification.

This specification describes technologies for improved recovery and verification of a public key in the context of a blockchain network. For context, a blockchain network can incorporate a public key infrastructure (PKI) in which a sender can use the sender's private key for encryption while a receiver can use the sender's public key for decryption. Under PKI, the sender's public key and private key form a unique pair. Although the sender keeps the private key private so that no one else knows about it, the public key can be published. This allows information to be encrypted using one of the keys and the other of the pair is used for decryption. In this context, this specification incorporates, for example, elliptic curve algorithms for implementing the PKI for a blockchain network.

Some embodiments allow a public key to be restored by generating a recoverable public key signature. By incorporating the calculation logic of an identification parameter into a public key generating process in the elliptic curve digital signature algorithm (ECDSA), the output digital signature can be accompanied by the identification parameter. In some cases, the identification parameter can be used to efficiently restore the public key. Additionally or alternatively, some cases allow the restoration process to traverse all likely instances of the identification parameter until a verifiable public key is restored.

In more detail, these embodiments generally involve extracting information from a message transmitted over the blockchain network by the sender, recovering a public key from the information, and verifying the public key as recovered. In particular, the information extracted from the message can include an identification parameter in addition to a hash value of the message, a digital signature embedded by the transmitter of the message, and parameters of an elliptic curve. The presence of the identification parameter allows recovery of the public key based on the information as extracted through simple comparison steps. More details are described below with reference to FIGS. 1 to 9.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical *Byzantine* fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
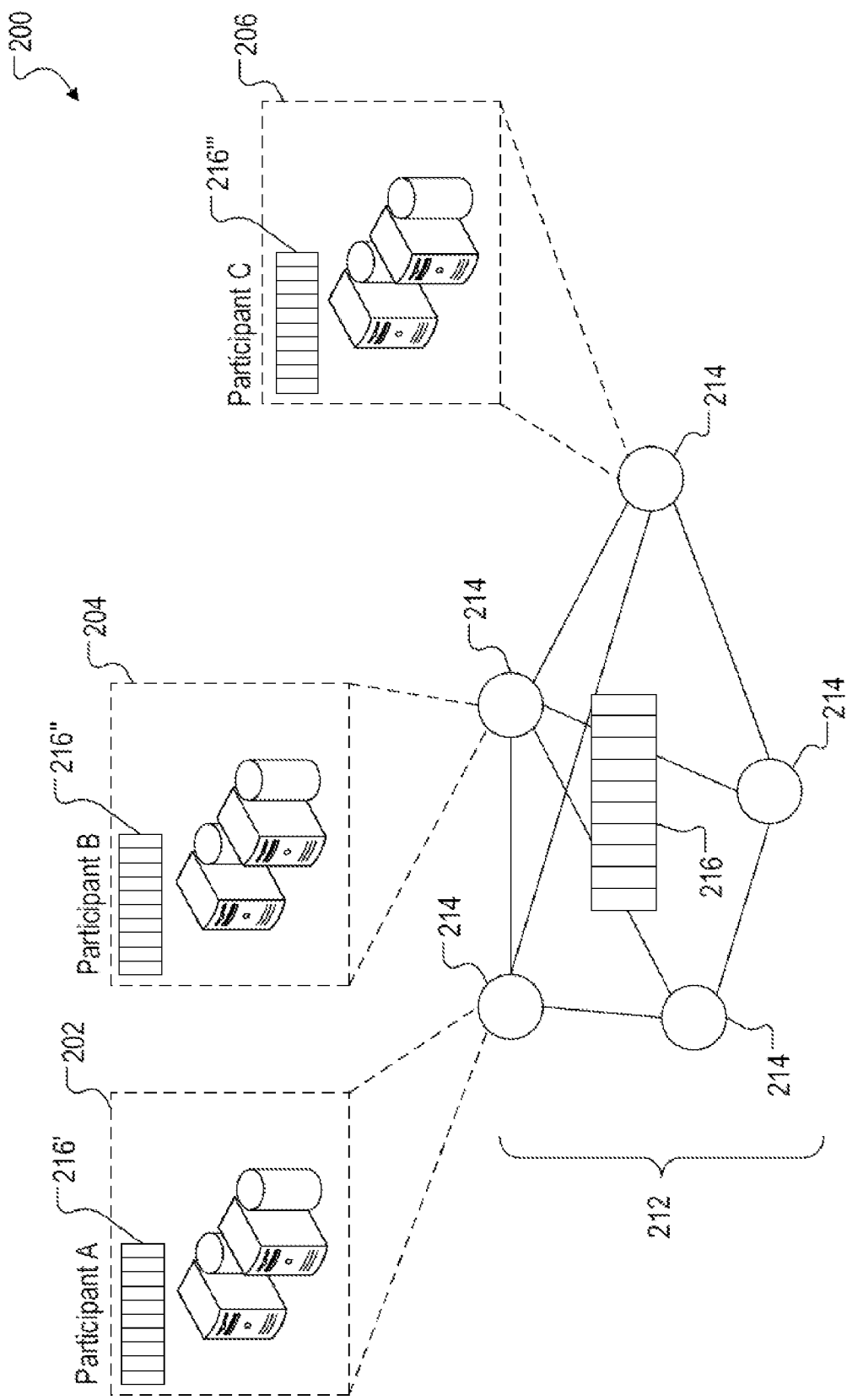
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical *Byzantine* state machine replication that tolerates *Byzantine* faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

The asymmetric cryptography described above can incorporate the elliptic curve digital signature algorithm (ECDSA) to achieve comparable encryption results as the Rivest-Shamir-Adleman (RSA) algorithms, but with fewer bits. For example, an exemplary RSA 2048-bit public key provides a security level of 112 bits. However, ECDSA may only need 224-bit sized public keys to provide the same 112-bit security level. Smaller key sizes can lead to less bandwidth to set up, for example, a secure socket layer/ transport layer security (SSL/TLS) stream over the blockchain network, which means that ECDSA certificates can be more advantageous for mobile applications. Moreover, such certificates can be stored into devices with much more limiting memory constraints, a fact that allows TLS stacks to be implemented in Internet of Things (IoT) devices without allocating many resources. In many applications over the blockchain network, when a message is received from a sender, it becomes desirable for the receiver to efficiently restore and verify the sender's public key based on the information received.

Figure 3:
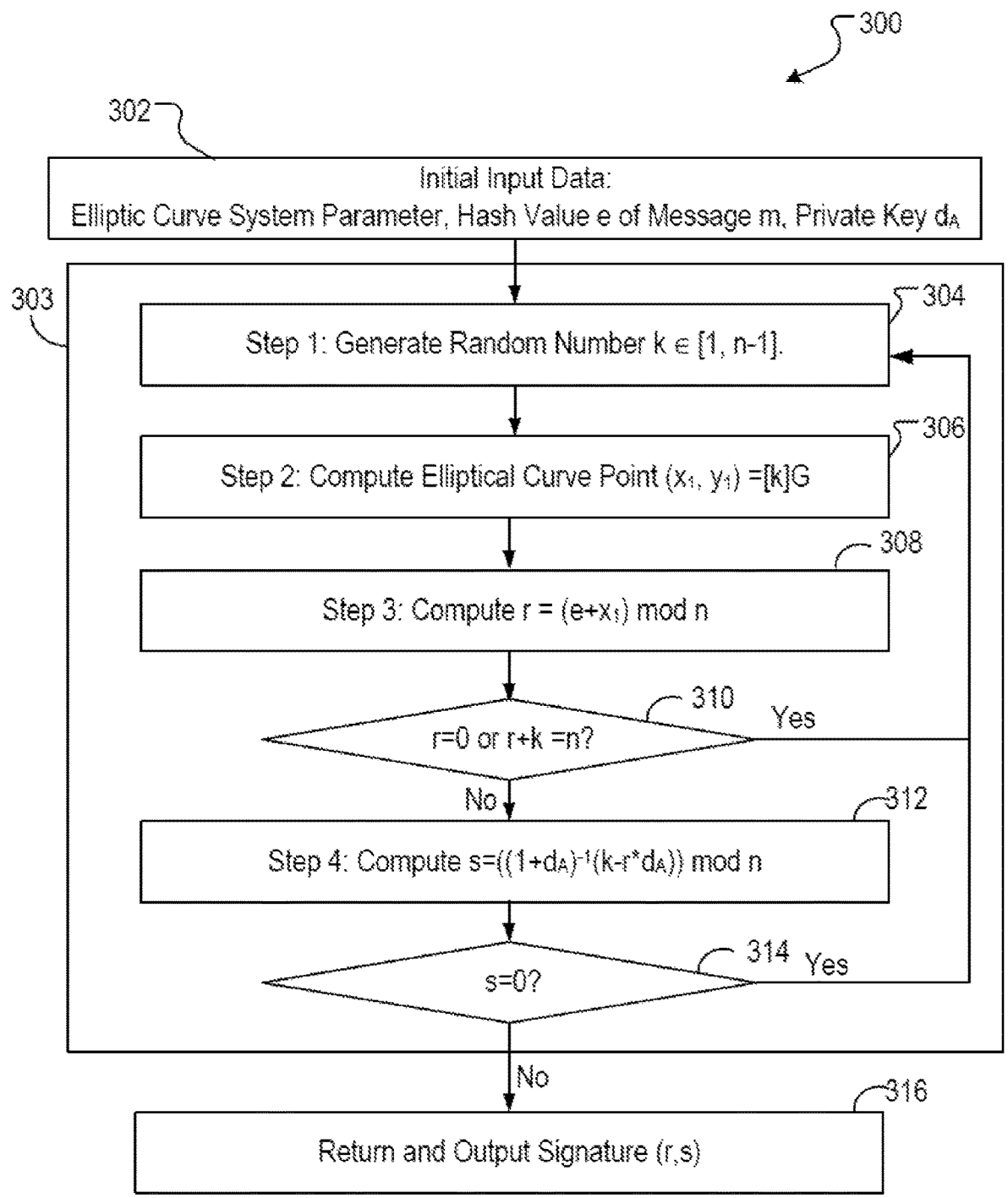
FIG. 3 is a diagram illustrating an example of a process that can be executed for generating a digital signature using the elliptic curve digital signature algorithm (ECDSA) in accordance with embodiments of this specification.
Figure 4:
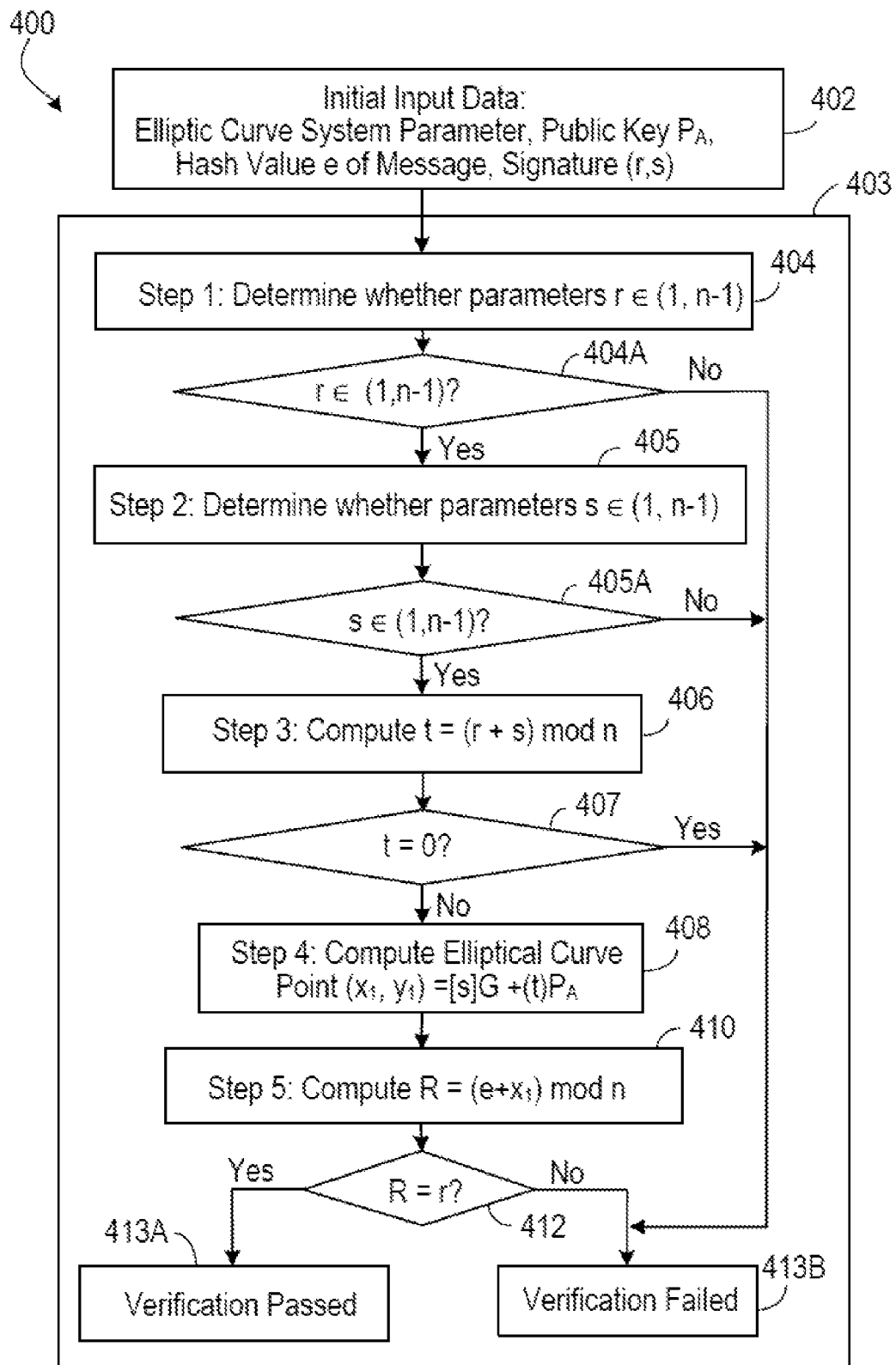
FIG. 4 is a diagram illustrating an example of a process that can be executed for verifying a digital signature using the elliptic curve digital signature algorithm (ECDSA) in accordance with embodiments of this specification.

Referring to FIGS. 3 and 4, diagrams for generating a digital signature using the elliptic curve digital signature algorithm (ECDSA) and for verifying a digital signature using the elliptic curve digital signature algorithm (ECDSA) in accordance with embodiments of this specification are described. As illustrated by process 300 for generating a digital signature, initial data values are received which can incorporate elliptic curve parameters, a hash value (e) of the message (M) for transmitting by the sender, and a private key ($d_A$) of the sender (user A) (302). Here, the elliptic curve parameters can include: the size q of a finite field Fq (when $q=2^m$, also including basis representation and irreducible polynomial); the two elements a and b (in this finite field Fq) which define the elliptic curve equation; the base point $G=(x_G, y_G)$, where $x_G$ and $y_G$ are elements in Fq; the degree n of G; and others. Process 300 then proceeds to computing an output signature that encompasses a first parameter r and a second parameter s (303), which may involve four steps, namely steps 1 to 4, as described in more detail below. At step 1, a random number k E [1,n−1] is generated using a random number generator (304). The number n here is a prime number corresponding to the degree of a base point G, as characterized by parameters of the elliptic curve. At step 2, the elliptic curve point is computed according to $(x_1, y_1)=[k]$ G, and then the data type of $x_1$ is converted to an integer (306). Here, $(x_1, y_1)$ represents a coordinate point on the elliptic curve, [k] G represents k multiples of point G over the elliptic curve, and G represents a base point on the elliptic curve. At step 3, a parameter r is computed according: $r=(e+x_1)$ mod n (308). Here, e is the hash value of the message M to be transmitted by the sender, and mod means a modulo operation. Next, a determination is made regarding if r equals 0 or r+k equals to n (310). If the result is yes, the process returns to step 1. If the result is no, the process proceeds to step 4 in which a second parameter s is computed according to: $s=((1+d_A)^{-1} (k-r*d_A))$ mod n (312). Here, the $^{-1}$ operator signifies an inverse operation in which the result is the inverse under modulo n; and $r*d_A$ represents a modular multiplication. Next, a determination is made regarding if s equals to 0 (314). If the result is yes, the process returns to step 1. If the result is no, the process proceeds to returning and outputting a digital signature that includes the first parameter r and the second parameter s (316).

As illustrated by process 400 for restoring a public key on the receiver side (referred to as user B), initial input data is received that includes elliptic curve parameters, a public key published as $P_A$, a hash value e of the message from the sender, and a digital signature encompassing a first parameter r and a second parameter s (402). Process 400 then proceeds to restoring and verifying the public key through five steps, namely steps 1 to 5, as described in more detail below. At step 1, process 400 determines whether r ∈[1, n−1] is true (404). Here, the first parameter r of the digital signature is checked against the range of from 1 to n−1, where 1 is the lower limit of the range and n characterizes the upper limit of the range (404A). If r is not within the range, the verification will not pass (413B). Next, at step 2, process 400 determines whether s ∈[1, n−1] is true (405). Here, the second parameter s of the digital signature is checked against the range of from 1 to n−1, where 1 is the lower limit of the range and n characterizes the upper limit of the range (405A). Ifs is not within the range, the verification will not pass (413B). At step 3, a parameter t is computed as (r+s) mod n (406). Here, a determination is made as to whether t equals to 0 (407). If so, the verification fails (413). If not, process 400 proceeds to computing the elliptic curve point that is presented as $(x_1, y_1)$ and computed as $[s]G+[t]P_A$ (408). Here, G represents a base point on the elliptic curve and $P_A$ represents the published public key of user A (sender). At step 5, a variable R is computed as: $(e+x_1)$ mod n, (410), signifying a modulo operation. Here, a determination is made as to whether R equals to r is true (412). If R and r match, the verification is passed (413A); otherwise, the verification fails (413B).

Figure 5:
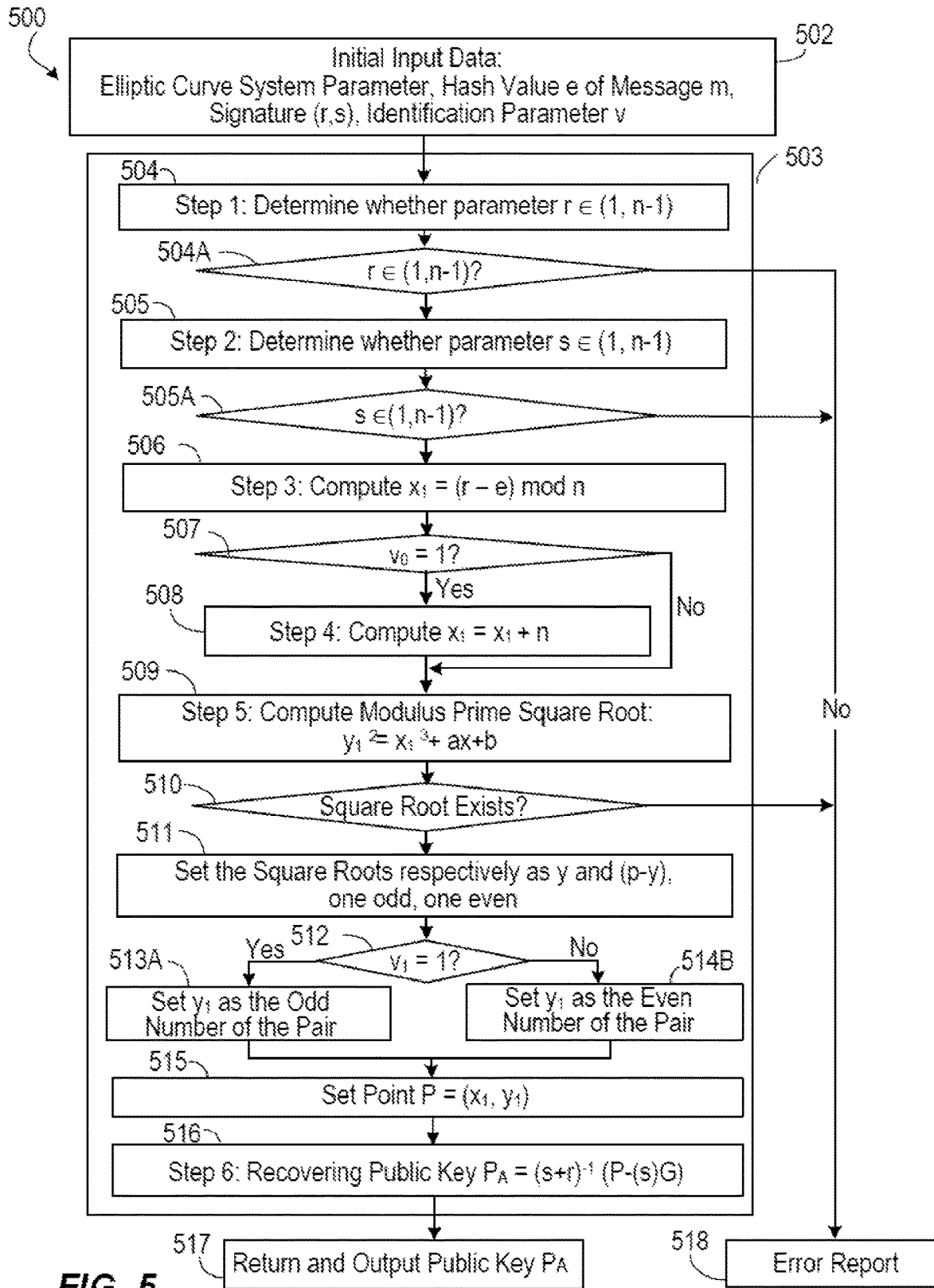
FIG. 5 is a diagram illustrating an example of a process that can be executed for recovering a public key using the elliptic curve digital signature algorithm (ECDSA) in accordance with embodiments of this specification.

FIG. 5 is a diagram illustrating an example of a process 500 that can be executed for recovering a public key by using the elliptic curve digital signature algorithm (ECDSA) that incorporates an identification parameter in accordance with embodiments of this specification. The initial input data received includes elliptic curve parameters, a hash value e of the message M from the sender (user A), and a signature encompassing a first parameter r and a second parameter s, and an identification parameter v (502). Process 500 then proceeds to restoring and verifying the public key through six steps, namely steps 1 to 6, as described in more detail below (503). At step 1, process 500 determines whether $r \in [1, n-1]$ is true (504). Here, the first parameter r of the digital signature is checked against the range of from 1 to n−1, where 1 is the lower limit of the range and n characterizes the upper limit of the range (504A). As described above, n is a prime number and is also the degree of the base point G on the elliptic curve. If r is not within the range, the verification will not pass and an error report issues (518). Next, at step 2, process 500 determines whether $s \in [1, n-1]$ is true (505). Here, the second parameter s of the digital signature is checked against the range of from 1 to n−1, where 1 is the lower limit of the range and n characterizes the upper limit of the range (505A). If s is not within the range, the verification will not pass and an error report issues (518). At step 3, a first coordinate parameter $x_1$ is computed as $x_1 = (r-e)$ mod n (506). Here, mod n represents a modulo operation. A determination is made as to whether a lower bit of the identification parameter v, $v_0$ equals 1 (407). If so, $x_1$ remains at the current value; otherwise $x_1$ is calculated $x_1 = x_1 + n$, as shown in step 4 (508). This calculation enforces that $x_1$ is range bounded. At step 5, the square roots y of the modulus p are calculated according to: $y_1^2 = x_1^3 + ax + b$ (509). There, parameters a and b are determined by the elliptic curve parameters. A determination is made as to whether the square roots exist (510). If the determination is no, then an error report issues (518). If the square roots exist, the root that corresponds to an odd number is set as y and the root that corresponds to an even number is set as p−y (511). Here, p is one parameter of the elliptic curve. As a prime number, p satisfies: $(p-y)^2 = (p^2 - 2py + y^2) = y^2$ mod p. A determination is then made as to whether a higher bit of the identification parameter v, $v_1$ equals to 1 (512). In response to determining that $v_1$ equals to 1, $y_1$ is set to an odd number of the two available roots (513A); otherwise, $y_1$ is set to an even number of the two available roots (513B). Process 500 then proceeds to set the elliptic curve point as represented by the coordinate point of $P=(x_1, y_1)$ (515). In step 6, the calculated public key is restored: $P_A = (s+r)^{-1} (P-[s] G)$ (516). Here, G represents a base point on the elliptic curve, [s] G represents s multiple of G over the elliptic curve. At step 7, the calculated public key $P_A$ is returned as the restored public key of user A (sender).

Figure 6:
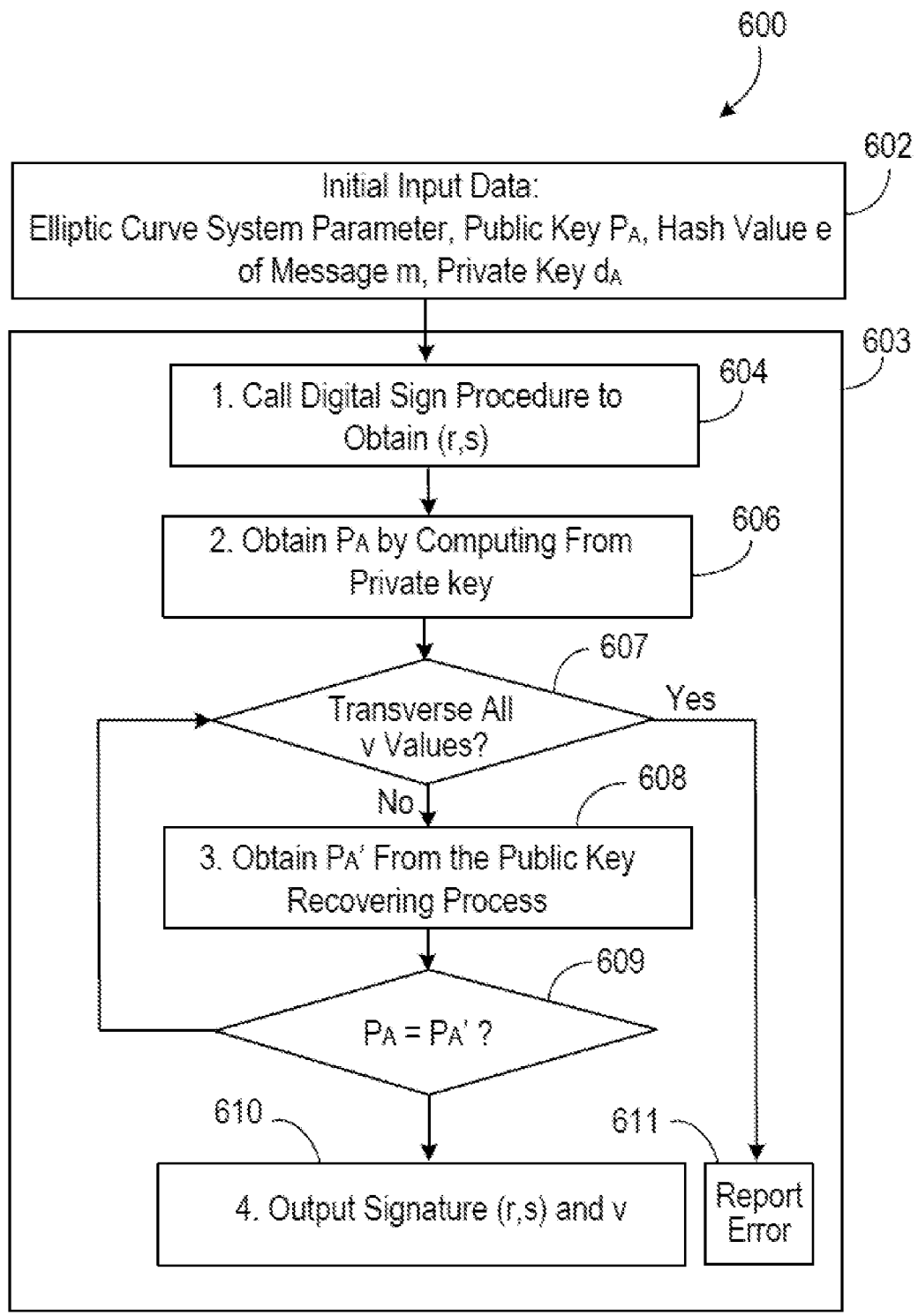
FIG. 6 is a diagram illustrating an example of a process that can be executed for verifying a public key using the elliptic curve digital signature algorithm (ECDSA) in accordance with embodiments of this specification.

FIG. 6 is a diagram illustrating an example of a process 600 that can be executed for restoring and verifying a public key using the elliptic curve digital signature algorithm (ECDSA) in accordance with embodiments of this specification. Initial input data is received that includes elliptic curve parameters, a public key published as $P_A$, a hash value e of the message from user A (sender) to be signed, and a private key $d_A$ of user A (sender) (602). Process 600 then proceeds to restoring and verifying the public key (603), as described in the following three steps. At step 1, the first and second parameters (r, s) of a digital signature are obtained by invoking a process as described by FIG. 3 (steps 302 to 316). At step 2, a public key $P_A$ is computed from the private key $d_A$ (606). This computation can generally follow the asymmetric cryptograph paradigm under PKI. Next, process 600 traverses all likely instances of the 2-bit identification parameter v (607). At step 3, each iteration during the traversal includes calling the signature recovery public key process (as illustrated in FIGS. 5 (502 to 518)) to obtain the public key $P_A'$ (608). A determination is made as to whether $P_A$ equal $P_A'$ (609). If the two matches, process 600 can output a digital signature (that includes the first parameter r and the second parameter s) accompanied by the identification parameter v. This combination may be referred to as the recoverable public key digital signature, annotated by (r, s, v). If the two do not match, process 600 may proceed to check out the next likely instance for the identification parameter v (607). If all instances of the identification parameter v are checked and nothing matches, process 600 may report error (611).

Figure 7:
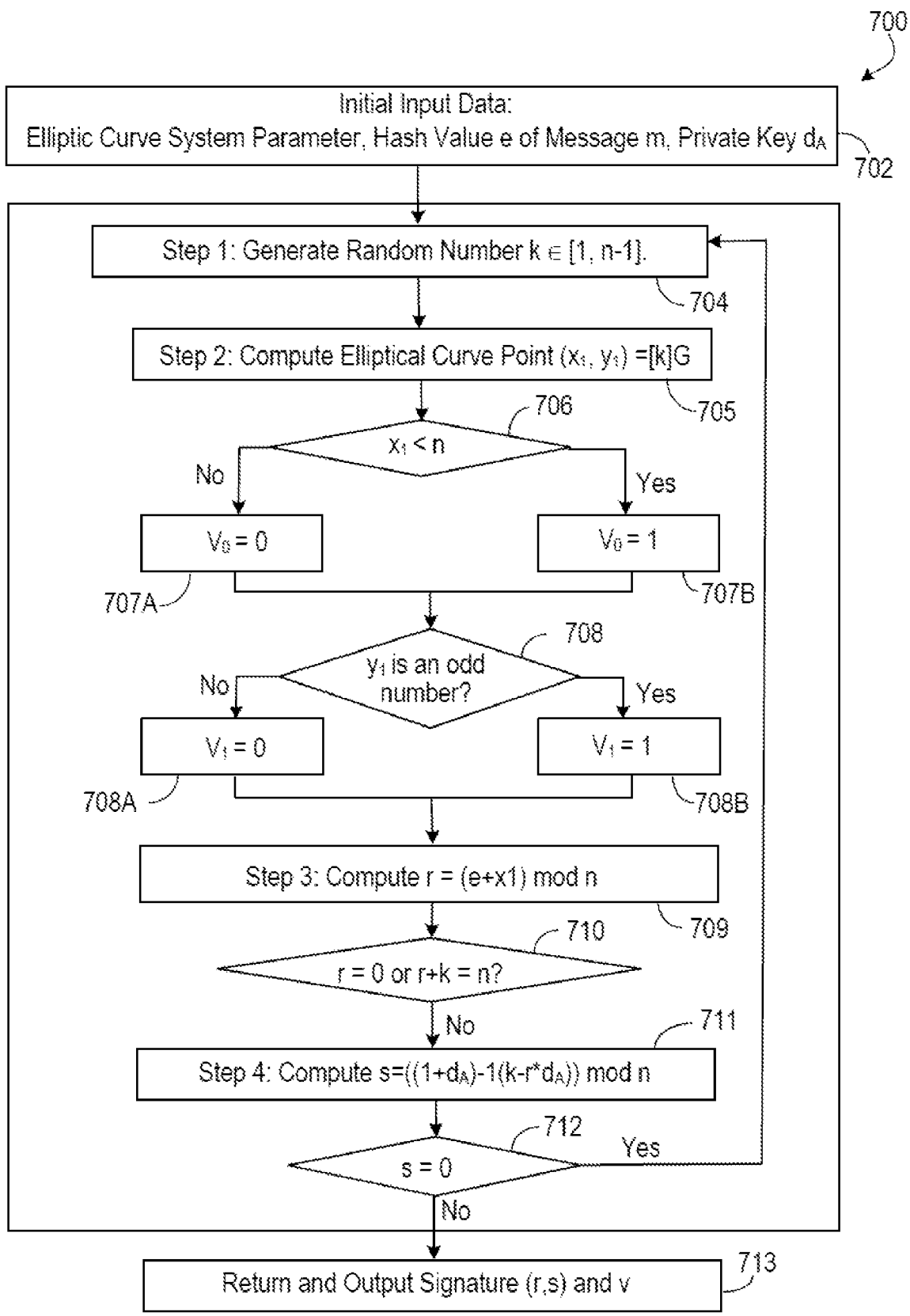
FIG. 7 is a diagram illustrating an example of a process that can be executed for generating a digital signature and an identification parameter using the elliptic curve digital signature algorithm (ECDSA) in accordance with embodiments of this specification.

FIG. 7 is a diagram illustrating an example of a process 700 that can be executed for generating a digital signature and an identification parameter using the elliptic curve digital signature algorithm (ECDSA) in accordance with embodiments of this specification. The initial input data received includes elliptic curve parameters, a public key published as PA, a hash value e of the message from the sender (user A), and a signature encompassing a first parameter r and a second parameter s, and an identification parameter v (702). Process 700 then proceeds to restoring and verifying the public key through four steps, namely steps 1 to 4, as described in more detail below (703). At step 1, a random number k is generated within the range of [1, n−1] using a random number generator (704). At step 2, the elliptic curve point is calculated as a coordinate point (x1, y1), which is calculated as [k] G (705). Here, [k] G represents k multiples of the base point G on the elliptic curve. The data type of $x_1$ is converted to an integer. After initializing the lower bit $v_0$ and higher bit $v_1$ of the identification parameter to 0, a determination is made as to whether $x_1$ is smaller than n, wherein n is the degree of the base point G. In response to determining that $x_1$ is no smaller than n, the lower bit $v_0$ of the identification parameter v is set to 0 (707A). In response to determining that $x_1$ is smaller than n, the lower bit $v_0$ of the identification parameter v is set to 1 (707B). Next, a determination is made as to whether $y_1$ is an odd number (708). In response to determining that $y_1$ is not an odd number, the higher bit $v_1$ of the identification parameter v is set to 0 (708A). In response to determining that $y_1$ is an odd number, the higher bit $v_1$ of the identification parameter v is set to 1 (708B). At step 3, the first parameter r of the digital signature is computed as: $r = (e+x1)$ mod n (709). A determination is then made as to whether r equals to 0 or r+k equals to n (710). If the determination is yes, process 700 returns to step 1 (704). Otherwise, process 700 proceeds to step 4, in which the second parameter s of the digital signature is computed as: $s = ((1+d_A)^{-1} (k - r*d_A))$ mod n (711). Here, $^{-1}$ represents an inverse operation over modulo n, and mod n represents a modulo operation. A determination is then made as to where s equals 0 (712). If the determination is yes, process 700 returns to step 1 (704).

Otherwise, process 700 proceeds to step 5, which returns the recoverable public key digital signature (r, s, v) (713). Here, $v=\{v_0, v_1\}$.

Figure 8:
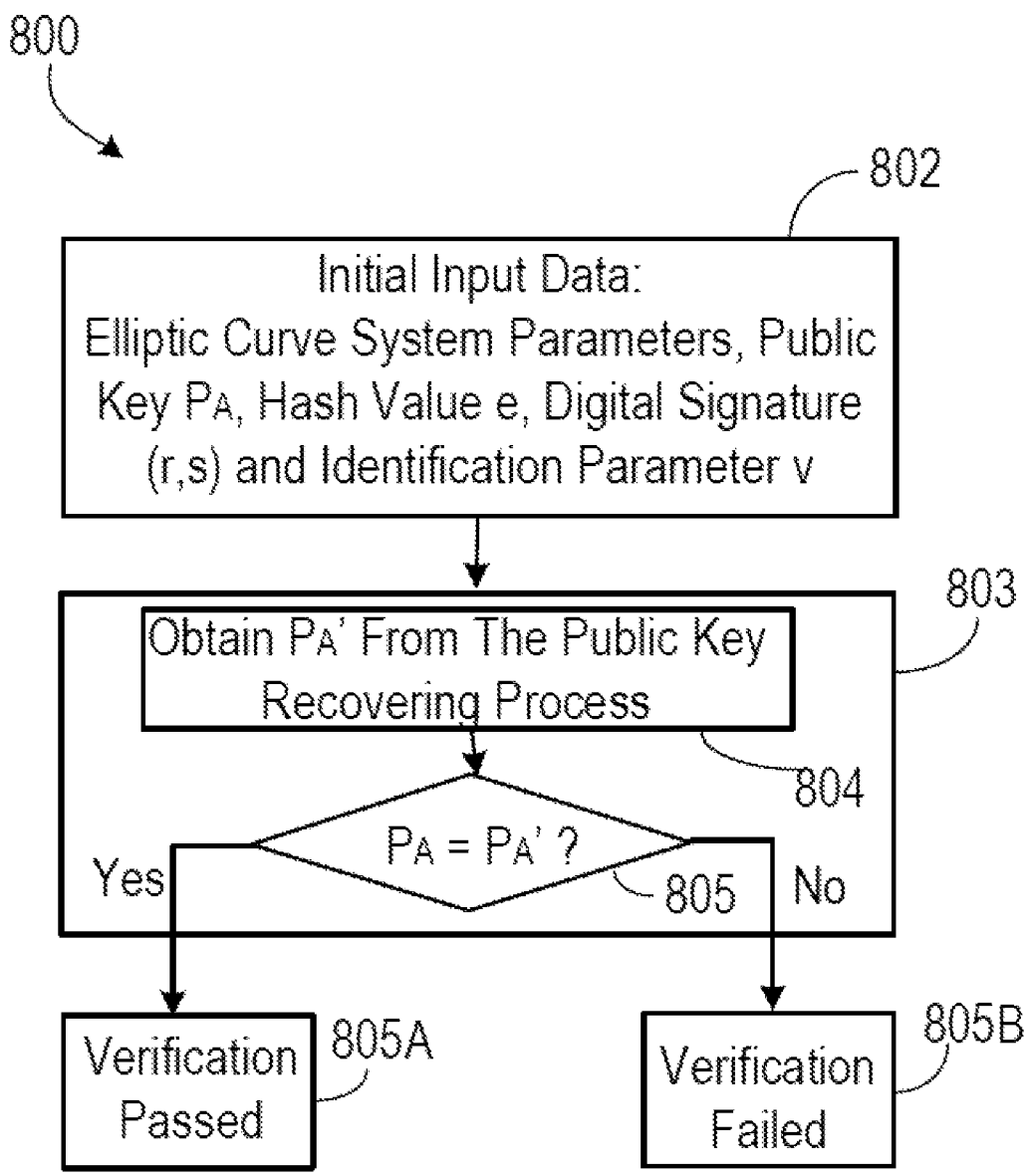
FIG. 8 is a diagram illustrating another example of a process that can be executed for verifying a public key using the elliptic curve digital signature algorithm (ECDSA) in accordance with embodiments of this specification.

FIG. 8 is a diagram illustrating another example of a process 800 that can be executed for verifying a public key using the elliptic curve digital signature algorithm (ECDSA) in accordance with embodiments of this specification. Initial input data is received that includes elliptic curve parameters, a public key published as $P_A$, a hash value e of the message m from user A (sender), a digital signature including the first parameter r and the second parameter s, and an identification parameter v (802). A public key $P_A'$ is obtained and verified based, at least on the recoverable digital signature that includes the first parameter r and the second parameter s, and an identification parameter v (803). In particular, the public key $P_A'$ is obtained by invoking the public key recovery process as described above in FIG. 5 (804). The recovered public key $P_A'$ is then compared with the published public key $P_A$ (805). In response to determining that the two matches, the verification is passed (805A). In response to determining that the two do not match, the verification has failed (805B).

Figure 9:
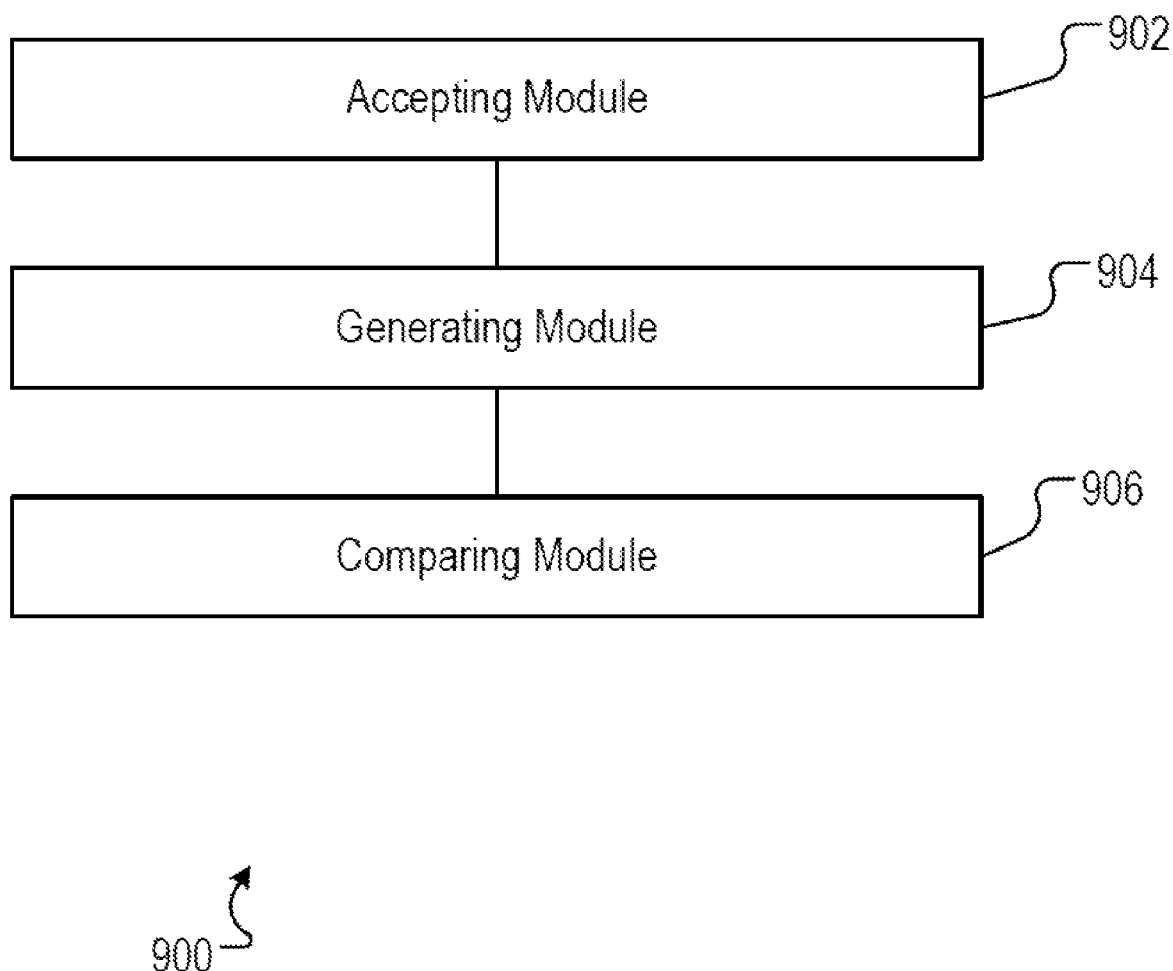
FIG. 9 depicts examples of modules of an apparatus in accordance with embodiments of this specification.

FIG. 9 depicts examples of modules of an apparatus 900 in accordance with embodiments of this specification. The apparatus 900 can be an example of an embodiment of a system for recovering and verifying a public key. The apparatus 900 can correspond to the embodiments described above, and the apparatus 900 includes the following: an accepting module 902 for receiving information encoding parameters for recovering and verifying a public key, a generating module 904 for generating a recovered public key based on the parameters, and a comparing module 906 for comparing a published public key with the recovered public key to verify, for example, the published public key. The parameters include: parameters of an elliptic curve, a published public key, a hash value of a message, a digital signature, and an identification parameter.

In an optional embodiment, the comparing module further performs the following: in response to determining that the published public key and the recovered public key match, determining that the published public key is verified; and in response to determining that the published public key and the recovered public key do not match, determining that the published public key is not verified.

In an optional embodiment, the generating module further performs the following: determining whether a first parameter included in the digital signature is within a bounded range, wherein the bounded range is from a lower limit to an upper limit, wherein the lower limit is unity, wherein the upper limit is characterized by the specific prime number included in the parameters of the elliptic curve. In this optional embodiment, the generating module further performs the following: in response to determining that the first parameter is not within the bounded range, returning an error message. In this optional embodiment, the generating module further performs the following: verifying whether a second parameter included in the digital signature is within the bounded range; and in response to determining that the second parameter is not within the bounded range, returning an error message.

In an optional embodiment, the generating module further performs the following: computing a first coordinate parameter based, at least, on the digital signature and the hash value, wherein the first coordinate parameter is computed by: subtracting the hash value from the first parameter included by the digital signature to generate a subtraction result, and performing a modulo operation on the subtract result to obtain the first coordinate parameter. In this optional embodiment, the generating module further performs: in response to determining that the first coordinate parameter equals unity, incrementing the first coordinate parameter by the specific prime number that characterizes the upper limit of the bounded range.

In an optional embodiment, the generating module further performs the following: computing modulo prime square roots of an elliptic equation characterized by the parameters of the elliptic curve to determine a second coordinate parameter, wherein the modulo prime square roots are computed for the elliptic equation instantiated by the first coordinate parameter. In this optional embodiment, the generating module further performs the following: in response to determining that a particular bit of the identification parameter is unity, setting the second coordinate parameter as an odd member of the modulo prime square roots; and in response to determining that the particular bit of the identification parameter is zero, setting the second coordinate parameter as an even member of the modulo prime square roots. In this optional embodiment, the generating module further performs: configuring a coordinate point that is specified by a pairing of the first coordinate parameter and the second coordinate parameter, wherein the recovered public key is generated based, at least, on the first and second parameters included by the digital signature, the coordinate point specified by the pairing of the first coordinate parameter and the second coordinate parameter, and the parameters of the elliptic curve.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 9, it can be interpreted as illustrating an internal functional module and a structure of a computing apparatus for encryption or decryption. An execution body in essence can be an electronic device, and the electronic device includes the following: one or more processors; and a memory configured to store an executable instruction of the one or more processors.

This specification describes specific embodiments for restoring and verifying the public key with low overhead. By incorporating the identification parameter v into the work flow for generating the digital signature on part of the sender, the public key associated with the digital signature can be recovered, with reduced overhead, by the receiver based on parameters received from the sender. In some cases, recovering the public key can be achieved by traversing various instances of the parameter v. These cases may incur an average of 1.5 times the duration for operating a procedure of recovering a public key to determine the parameter v. In other cases, the public key can be recovered based on a specific v value and the verification process involves only two comparisons. Such reduced overhead can bring significant impact to blockchain applications with intense encrypted traffic between a sender and a receiver. The savings can be particularly significant when participants in a blockchain network initiate key exchanges with each communicate session amongst them.

Described embodiments of the subject matter can include one or more features, alone or in combination.

For example, in a first embodiment, a computer-implemented method includes: accepting information encoding parameters of an elliptic curve, a published public key, a hash value of a message, a digital signature, and an identification parameter; generating a recovered public key based on the parameters of the elliptic curve, the hash value of the message, the digital signature, and the identification parameter; comparing the published public key and the recovered public key to verify the published public key. The foregoing and other described embodiments can each, optionally, include one or more of the following features:

A first feature, combinable with any of the following features, specifies that generating the recovered public key comprises: determining whether a first parameter included in the digital signature is within a bounded range. In this first feature, the bounded range is from a lower limit to an upper limit, wherein the lower limit is unity, wherein the upper limit is characterized by the specific prime number included in the parameters of the elliptic curve. This first feature further specifies that: in response to determining that the first parameter is not within the bounded range, returning an error message. In this optional embodiment, generating the recovered public key comprises further performs the following: verifying whether a second parameter included in the digital signature is within the bounded range; and in response to determining that the second parameter is not within the bounded range, returning an error message.

A second feature, combinable with any of the previous or following features, specifies that generating the recovered public key further comprises: computing a first coordinate parameter based, at least, on the digital signature and the hash value. In this second feature, the first coordinate parameter is computed by: subtracting the hash value from the first parameter included by the digital signature to generate a subtraction result, and performing a modulo operation on the subtract result to obtain the first coordinate parameter. This second feature specifies that generating the recovered public key further comprises: in response to determining that the first coordinate parameter equals unity, incrementing the first coordinate parameter by the specific prime number that characterizes the upper limit of the bounded range.

A third feature, combinable with any of the previous or following features, specifies that generating the recovered public key further comprises: computing modulo prime square roots of an elliptic equation characterized by the parameters of the elliptic curve to determine a second coordinate parameter. In this third feature, the modulo prime square roots are computed for the elliptic equation instantiated by the first coordinate parameter. This third feature specifies that generating the recovered public key further comprises: in response to determining that a particular bit of the identification parameter is unity, setting the second coordinate parameter as an odd member of the modulo prime square roots; and in response to determining that the particular bit of the identification parameter is zero, setting the second coordinate parameter as an even member of the modulo prime square roots. This third feature specifies that generating the recovered public key further comprises: configuring a coordinate point that is specified by a pairing of the first coordinate parameter and the second coordinate parameter, wherein the recovered public key is generated based, at least, on the first and second parameters included by the digital signature, the coordinate point specified by the pairing of the first coordinate parameter and the second coordinate parameter, and the parameters of the elliptic curve.

A fourth feature, combinable with any of the previous or following features, specifies that generating the recovered public key further comprises: in response to determining that the published public key and the recovered public key match, determining that the published public key is verified; and in response to determining that the published public key and the recovered public key do not match, determining that the published public key is not verified.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for recovering and verifying a public key, the computer-implemented method comprising:
accepting information encoding parameters of an elliptic curve, a published public key, a hash value of a message, a digital signature, and an identification parameter;
generating a recovered public key based on the parameters of the elliptic curve, the hash value of the message, the digital signature, and the identification parameter, wherein generating the recovered public key comprises:
determining whether a first parameter included in the digital signature is within a bounded range, wherein the bounded range is from a lower limit to an upper limit, wherein the lower limit is unity, and wherein the upper limit is characterized by a specific prime number included in the parameters of the elliptic curve,
computing a first coordinate parameter based, at least, on the digital signature and the hash value, comprising:
subtracting the hash value from the first parameter included by the digital signature to generate a subtraction result, and
performing a modulo operation on the subtract result to obtain the first coordinate parameter,
in response to determining that the first coordinate parameter equals unity, incrementing the first coordinate parameter by the specific prime number that characterizes the upper limit of the bounded range, and
computing modulo prime square roots of an elliptic equation characterized by the parameters of the elliptic curve to determine a second coordinate parameter, wherein the modulo prime square roots are computed for the elliptic equation instantiated by the first coordinate parameter; and
comparing the published public key and the recovered public key to verify the published public key.

2. The computer-implemented method of claim 1, further comprising:
in response to determining that the first parameter is not within the bounded range, returning an error message.

3. The computer-implemented method of claim 1, wherein generating the recovered public key further comprises:
verifying whether a second parameter included in the digital signature is within the bounded range; and
in response to determining that the second parameter is not within the bounded range, returning an error message.

4. The computer-implemented method of claim 1, further comprising:
in response to determining that a particular bit of the identification parameter is unity, setting the second coordinate parameter as an odd member of the modulo prime square roots; and
in response to determining that the particular bit of the identification parameter is zero, setting the second coordinate parameter as an even member of the modulo prime square roots.

5. The computer-implemented method of claim 1, further comprising:
configuring a coordinate point that is specified by a pairing of the first coordinate parameter and the second coordinate parameter, wherein the recovered public key is generated based, at least, on the first parameter and the second parameter included by the digital signature, the coordinate point specified by the pairing of the first coordinate parameter and the second coordinate parameter, and the parameters of the elliptic curve.

6. The computer-implemented method of claim 1, wherein comparing the published public key and the recovered public key to verify the published public key further comprises:
in response to determining that a match exists between the published public key and the recovered public key, determining that the published public key is verified; and
in response to determining that a match does not exist between the published public key and the recovered public key, determining that the published public key is not verified.

7. A non-transitory, computer-readable storage medium storing one or more instructions executable by a computer system to perform operations for recovering and verifying a public key, the operations comprising:
accepting information encoding parameters of an elliptic curve, a published public key, a hash value of a message, a digital signature, and an identification parameter;
generating a recovered public key based on the parameters of the elliptic curve, the hash value of the message, the digital signature, and the identification parameter, wherein generating the recovered public key comprises:
determining whether a first parameter included in the digital signature is within a bounded range, wherein the bounded range is from a lower limit to an upper limit, wherein the lower limit is unity, and wherein the upper limit is characterized by a specific prime number included in the parameters of the elliptic curve,
computing a first coordinate parameter based, at least, on the digital signature and the hash value, comprising:
subtracting the hash value from the first parameter included by the digital signature to generate a subtraction result, and
performing a modulo operation on the subtract result to obtain the first coordinate parameter,
in response to determining that the first coordinate parameter equals unity, incrementing the first coordinate parameter by the specific prime number that characterizes the upper limit of the bounded range, and
computing modulo prime square roots of an elliptic equation characterized by the parameters of the elliptic curve to determine a second coordinate parameter, wherein the modulo prime square roots are computed for the elliptic equation instantiated by the first coordinate parameter; and comparing the published public key and the recovered public key to verify the published public key.

8. The non-transitory, computer-readable storage medium of claim 7, wherein the operations further comprise:

in response to determining that the first parameter is not within the bounded range, returning an error message.

9. The non-transitory, computer-readable storage medium of claim 7, wherein generating the recovered public key further comprises:

verifying whether a second parameter included in the digital signature is within the bounded range; and in response to determining that the second parameter is not within the bounded range, returning an error message.

10. The non-transitory, computer-readable storage medium of claim 7, the operations further comprising:

in response to determining that a particular bit of the identification parameter is unity, setting the second coordinate parameter as an odd member of the modulo prime square roots; and in response to determining that the particular bit of the identification parameter is zero, setting the second coordinate parameter as an even member of the modulo prime square roots.

11. The non-transitory, computer-readable storage medium of claim 7, the operations further comprising:

configuring a coordinate point that is specified by a pairing of the first coordinate parameter and the second coordinate parameter, wherein the recovered public key is generated based, at least, on the first parameter and the second parameter included by the digital signature, the coordinate point specified by the pairing of the first coordinate parameter and the second coordinate parameter, and the parameters of the elliptic curve.

12. The non-transitory, computer-readable storage medium of claim 7, wherein comparing the published public key and the recovered public key to verify the published public key further comprises:

in response to determining that a match exists between the published public key and the recovered public key, determining that the published public key is verified; and in response to determining that a match does not exist between the published public key and the recovered public key, determining that the published public key is not verified.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for recovering and verifying a public key, the operations comprising:

accepting information encoding parameters of an elliptic curve, a published public key, a hash value of a message, a digital signature, and an identification parameter, generating a recovered public key based on the parameters of the elliptic curve, the hash value of the message, the digital signature, and the identification parameter; and wherein generating the recovered public key comprises:

determining whether a first parameter included in the digital signature is within a bounded range, wherein the bounded range is from a lower limit to an upper limit, wherein the lower limit is unity, and wherein the upper limit is characterized by a specific prime number included in the parameters of the elliptic curve, computing a first coordinate parameter based, at least, on the digital signature and the hash value, comprising:

subtracting the hash value from the first parameter included by the digital signature to generate a subtraction result, and performing a modulo operation on the subtract result to obtain the first coordinate parameter, in response to determining that the first coordinate parameter equals unity, incrementing the first coordinate parameter by the specific prime number that characterizes the upper limit of the bounded range, and computing modulo prime square roots of an elliptic equation characterized by the parameters of the elliptic curve to determine a second coordinate parameter, wherein the modulo prime square roots are computed for the elliptic equation instantiated by the first coordinate parameter, and comparing the published public key and the recovered public key to verify the published public key.

14. The system of claim 13, wherein the operations further comprise:

in response to determining that the first parameter is not within the bounded range, returning an error message.

15. The system of claim 13, wherein generating the recovered public key further comprises:

verifying whether a second parameter included in the digital signature is within the bounded range; and in response to determining that the second parameter is not within the bounded range, returning an error message.

16. The system of claim 13, the operations further comprising:

in response to determining that a particular bit of the identification parameter is unity, setting the second coordinate parameter as an odd member of the modulo prime square roots; and in response to determining that the particular bit of the identification parameter is zero, setting the second coordinate parameter as an even member of the modulo prime square roots.

17. The system of claim 13, the operations further comprising:

configuring a coordinate point that is specified by a pairing of the first coordinate parameter and the second coordinate parameter, wherein the recovered public key is generated based, at least, on the first parameter and the second parameter included by the digital signature, the coordinate point specified by the pairing of the first coordinate parameter and the second coordinate parameter, and the parameters of the elliptic curve.

18. The system of claim 13, wherein comparing the published public key and the recovered public key to verify the published public key further comprises:

in response to determining that a match exists between the published public key and the recovered public key, determining that the published public key is verified; and in response to determining that a match does not exist between the published public key and the recovered public key, determining that the published public key is not verified.

* * * * *

UNITED STATES PATENT AND TRADEMARK OFFICE
CERTIFICATE OF CORRECTION

PATENT NO. : 10,778,428 B1
APPLICATION NO. : 16/714201
DATED : September 15, 2020
INVENTOR(S) : Yao Wang, Hao Lei and Li Lin Page 1 of 1

It is certified that error appears in the above-identified patent and that said Letters Patent is hereby corrected as shown below:

On the Title Page

Under Assignee
Column 1, Line 1, delete "Allibaba" and insert -- Alibaba --, therefor.

In the Claims

Claim 13, Column 20, Line 2, delete "parameter; and" and insert -- parameter, --, therefor.

Signed and Sealed this
Tenth Day of November, 2020

Andrei Iancu
*Director of the United States Patent and Trademark Office*